United States Patent
McDonough et al.

(10) Patent No.: US 9,772,033 B2
(45) Date of Patent: Sep. 26, 2017

(54) ELECTRONIC TRANSMISSION RANGE SELECTION SUBSYSTEM IN A HYDRAULIC CONTROL SYSTEM FOR AN AUTOMATIC TRANSMISSION

(71) Applicant: GM Global Technology Operations LLC, Detroit, MI (US)

(72) Inventors: Joshua J. McDonough, Novi, MI (US); Philip C. Lundberg, Keego Harbor, MI (US); Vijay A. Neelakantan, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 107 days.

(21) Appl. No.: 14/816,716

(22) Filed: Aug. 3, 2015

(65) Prior Publication Data

US 2016/0069451 A1 Mar. 10, 2016

Related U.S. Application Data

(60) Provisional application No. 62/048,457, filed on Sep. 10, 2014.

(51) Int. Cl.

| | |
|---|---|
| *F16H 59/00* | (2006.01) |
| *F16H 61/00* | (2006.01) |
| *F16H 63/00* | (2006.01) |
| *F16H 61/02* | (2006.01) |
| *F16H 63/48* | (2006.01) |
| *F16H 63/34* | (2006.01) |

(52) U.S. Cl.
CPC ...... *F16H 61/0267* (2013.01); *F16H 61/0021* (2013.01); *F16H 63/3483* (2013.01); *F16H 63/483* (2013.01)

(58) Field of Classification Search
CPC ............ F16H 61/0021; F16H 63/3483; F16H 63/483; F16H 61/0267
See application file for complete search history.

(56) References Cited

U.S. PATENT DOCUMENTS

| | | | | |
|---|---|---|---|---|
| 4,030,381 A | * | 6/1977 | Lalin ...................... | F15B 21/044 477/151 |
| 2013/0319155 A1 | * | 12/2013 | Berger ..................... | F16H 59/08 74/473.11 |

FOREIGN PATENT DOCUMENTS

CN  103453134 A  12/2013

* cited by examiner

*Primary Examiner* — David M Fenstermacher
*Assistant Examiner* — Jake Cook

(57) ABSTRACT

A hydraulic control system for a transmission is provided. The hydraulic control system includes a source of pressurized hydraulic fluid that communicates with an electronic transmission range selection (ETRS) subsystem. In one example, the ETRS subsystem includes an ETRS control valve, a park servo that controls a park mechanism, a plurality of solenoids, and a park inhibit solenoid assembly. In another example, the ETRS subsystem includes an ETRS control valve, an ETRS enable valve, a park servo that controls a park mechanism, a plurality of solenoids, and a park inhibit solenoid assembly.

15 Claims, 3 Drawing Sheets

ELECTRONIC TRANSMISSION RANGE SELECTION SUBSYSTEM IN A HYDRAULIC CONTROL SYSTEM FOR AN AUTOMATIC TRANSMISSION

CROSS-REFERENCE TO RELATED APPLICATIONS

This application claims the benefit of U.S. Provisional Application No. 62/048,457 filed Sep. 10, 2014. The disclosure of the above application is incorporated herein by reference.

TECHNICAL FIELD

The invention relates to a hydraulic control system for an automatic transmission, and more particularly to an electronic transmission range selection subsystem in a hydraulic control system for an automatic transmission.

BACKGROUND

A typical automatic transmission includes a hydraulic control system that is employed to provide cooling and lubrication to components within the transmission and to actuate a plurality of torque transmitting devices. These torque transmitting devices may be, for example, friction clutches and brakes arranged with gear sets or in a torque converter. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to various subsystems including lubrication subsystems, cooler subsystems, torque converter clutch control subsystems, and shift actuator subsystems that include actuators that engage the torque transmitting devices. The pressurized hydraulic fluid delivered to the shift actuators is used to engage or disengage the torque transmitting devices in order to obtain different gear ratios.

The transmission generally operates in a plurality of modes of operation including out-of-Park driving modes and a Park mode. The out-of-Park driving modes generally include the forward gear or speed ratios (i.e. a Drive mode), at least one reverse gear or speed ratio (i.e. a Reverse mode), and a Neutral mode. Selection of the various driving modes is typically accomplished by engaging a shift lever or other driver interface device that is connected by a shifting cable or other mechanical connection to the transmission. Alternatively, the selection of a driving mode may be controlled by an electronic transmission range selection (ETRS) system, also known as a "shift by wire" system. In an ETRS system, selection of the driving modes is accomplished through electronic signals communicated between the driver interface device and the transmission. The ETRS system reduces mechanical components, increases instrument panel space, enhances styling options, and eliminates the possibility of shifting cable misalignment with transmission range selection levers.

While previous ETRS subsystems are useful for their intended purpose, the need for new and improved hydraulic control system configurations within transmissions which exhibit improved performance, especially from the standpoints of efficiency, responsiveness and smoothness, is essentially constant. These control systems must also meet specific safety requirements for new transmission and vehicle designs during particular failure modes of operation. Accordingly, there is a need for an improved, cost-effective ETRS subsystem within a hydraulic control system for use in a hydraulically actuated automatic transmission.

SUMMARY

A hydraulic control system for a transmission is provided. The hydraulic control system includes a source of pressurized hydraulic fluid that communicates with an electronic transmission range selection (ETRS) subsystem. In one embodiment, the ETRS subsystem includes an ETRS control valve, a park servo that controls a park mechanism, a plurality of solenoids, and a park inhibit solenoid assembly. In another embodiment, the ETRS subsystem includes an ETRS control valve, an ETRS enable valve, a park servo that controls a park mechanism, a plurality of solenoids, and a park inhibit solenoid assembly.

For example, the subsystem includes a first control device, a control valve assembly having a first port directly hydraulically connected downstream to the first control device, a second port, a third port, a fourth port, and a first valve moveable between a first position and a second position, and the first valve allows fluid communication between the first control device and the fourth port when in the first position and allows fluid communication between the first control device and the third port when in the second position, a park servo assembly directly hydraulically connected downstream to the third and fourth ports of the control valve assembly, the park servo assembly configured to control a park mechanism, and a second control device connected directly between the second port of the control valve assembly and the park servo assembly and the third port of the control valve assembly.

In another aspect, the park servo assembly includes an out-of-park port directly connected to the third port of the control valve assembly and to the second control device and a park port directly connected to the fourth port of the control valve assembly.

In yet another aspect, the park servo assembly includes a park piston mechanically connected to the park mechanism, and the park piston is moveable between an out-of-park position and a park position, and the out-of-park port communicates with an opposite side of the park piston than the park port.

In yet another aspect, a park inhibit solenoid assembly selectively engages the park piston to keep the park piston in the out-of-park position.

In yet another aspect, the control valve assembly includes a second valve coaxial with the first valve.

In yet another aspect, the control valve assembly includes a fifth port connected to a clutch actuator subsystem and the fifth port communicates hydraulic fluid to an end of the second valve.

In yet another aspect, the second port communicates hydraulic fluid to an end of the first valve.

In yet another aspect, the first control device receives pressurized hydraulic fluid from a pressure regulator subsystem.

In yet another aspect, the first control device is a normally high solenoid electronically controlled by a transmission control module.

In yet another aspect, the second control device is a normally high solenoid electronically controlled by the transmission control module.

In another example a hydraulic control system is provided that includes a pressure regulator subsystem for providing a pressurized hydraulic fluid, an enablement valve assembly having an inlet in communication with the pressure regulator subsystem, an outlet, a signal port, and an enablement valve moveable between a first position and a second position, wherein the enablement valve prohibits fluid communication from the inlet to the outlet when in the first position and allows fluid communication from the inlet to the outlet when in the second position, and a control valve assembly having a first port directly hydraulically connected downstream to the outlet of the enablement valve assembly, a second port, a third port, a fourth port, a first valve, and a second valve, wherein the first valve is moveable between a first position and a second position and the first valve allows fluid communication between the first port and the third port when in the first position and the first valve allows fluid communication between the first port and the second port when in the second position, and wherein the third port communicates with an end of the second valve. A park servo assembly is directly hydraulically connected downstream to the second and third ports of the control valve assembly, the park servo assembly configured to control a park mechanism. A first solenoid is downstream of the pressure regulator subsystem. A three-way check valve is connected to the first solenoid and to the signal port of the enablement valve assembly. A second solenoid is connected directly between the third port of the enablement valve assembly, the three-way check valve, and the fourth port of the control valve assembly.

Further features, aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1:
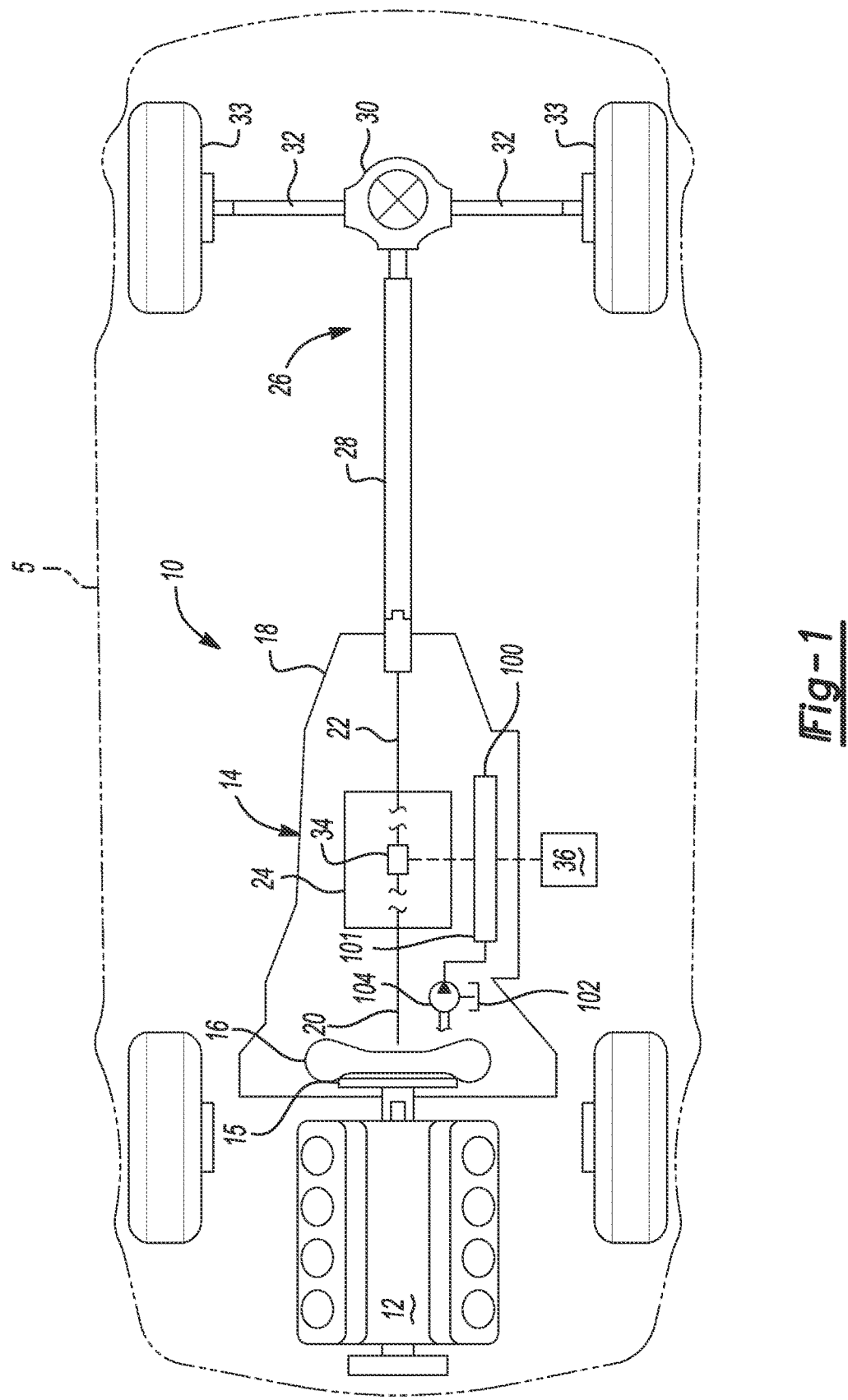
FIG. 1 is a is a schematic diagram of an exemplary powertrain in a motor vehicle.

With reference to FIG. 1, a motor vehicle is shown and generally indicated by reference number 5. The motor vehicle 5 is illustrated as a passenger car, but it should be appreciated that the motor vehicle 5 may be any type of vehicle, such as a truck, van, sport-utility vehicle, etc. The motor vehicle 5 includes an exemplary powertrain 10. It should be appreciated at the outset that while a rear-wheel drive powertrain has been illustrated, the motor vehicle 5 may have a front-wheel drive powertrain without departing from the scope of the present invention. The powertrain 10 generally includes an engine 12 interconnected with a transmission 14.

The engine 12 may be a conventional internal combustion engine or an electric engine, hybrid engine, or any other type of prime mover, without departing from the scope of the present disclosure. The engine 12 supplies a driving torque to the transmission 14 through a flexplate 15 or other connecting device that is connected to a starting device 16. The starter device 16 may be a hydrodynamic device, such as a fluid coupling or torque converter, a wet dual clutch, or an electric motor. It should be appreciated that any starting device between the engine 12 and the transmission 14 may be employed including a dry launch clutch.

The transmission 14 has a typically cast, metal housing 18 which encloses and protects the various components of the transmission 14. The housing 18 includes a variety of apertures, passageways, shoulders and flanges which position and support these components. Generally speaking, the transmission 14 includes a transmission input shaft 20 and a transmission output shaft 22. Disposed between the transmission input shaft 20 and the transmission output shaft 22 is a gear and clutch arrangement 24. The transmission input shaft 20 is functionally interconnected with the engine 12 via the starting device 16 and receives input torque or power from the engine 12. Accordingly, the transmission input shaft 20 may be a turbine shaft in the case where the starting device 16 is a hydrodynamic device, dual input shafts where the starting device 16 is dual clutch, or a drive shaft where the starting device 16 is an electric motor. The transmission output shaft 22 is preferably connected with a final drive unit 26 which includes, for example, propshaft 28, differential assembly 30, and drive axles 32 connected to wheels 33. The transmission input shaft 20 is coupled to and provides drive torque to the gear and clutch arrangement 24.

The gear and clutch arrangement 24 includes a plurality of gear sets, a plurality of clutches and/or brakes, and a plurality of shafts. The plurality of gear sets may include individual intermeshing gears, such as planetary gear sets, that are connected to or selectively connectable to the plurality of shafts through the selective actuation of the plurality of clutches/brakes. The plurality of shafts may include layshafts or countershafts, sleeve and center shafts, reverse or idle shafts, or combinations thereof. The clutches/brakes, indicated schematically by reference number 34, are selectively engageable to initiate at least one of a plurality of gear or speed ratios by selectively coupling individual gears within the plurality of gear sets to the plurality of shafts. It should be appreciated that the specific arrangement and number of the gear sets, clutches/brakes 34, and shafts within the transmission 14 may vary without departing from the scope of the present disclosure.

The transmission 18 includes a transmission control module 36. The transmission control module 36 is preferably an electronic control device having a preprogrammed digital computer or processor, control logic or circuits, memory used to store data, and at least one I/O peripheral. The control logic includes or enables a plurality of logic routines for monitoring, manipulating, and generating data and control signals. The transmission control module 36 controls the actuation of the clutches/brakes 34 via a hydraulic control system 100. In another example, the transmission control module 36 is an engine control module (ECM), or a hybrid control module, or any other type of controller.

The hydraulic control system 100 is disposed within a valve body 101 that contains and houses via fluid paths and valve bores most of the components of the hydraulic control system 100. These components include, but are not limited to, pressure regulation valves, directional valves, solenoids, etc. The valve body 101 may be attached to a bottom of the transmission housing 18 in rear-wheel drive transmissions or attached to a front of the transmission housing 18 in front-wheel drive transmissions. The hydraulic control system 100 is operable to selectively engage the clutches/brakes 34 and to provide cooling and lubrication to the transmission 14 by selectively communicating a hydraulic fluid from a sump 102 under pressure from either an engine driven pump 104 or an accumulator (not shown). The pump 104 may be driven by the engine 12 or by an auxiliary engine or electric motor.

Figure 2:
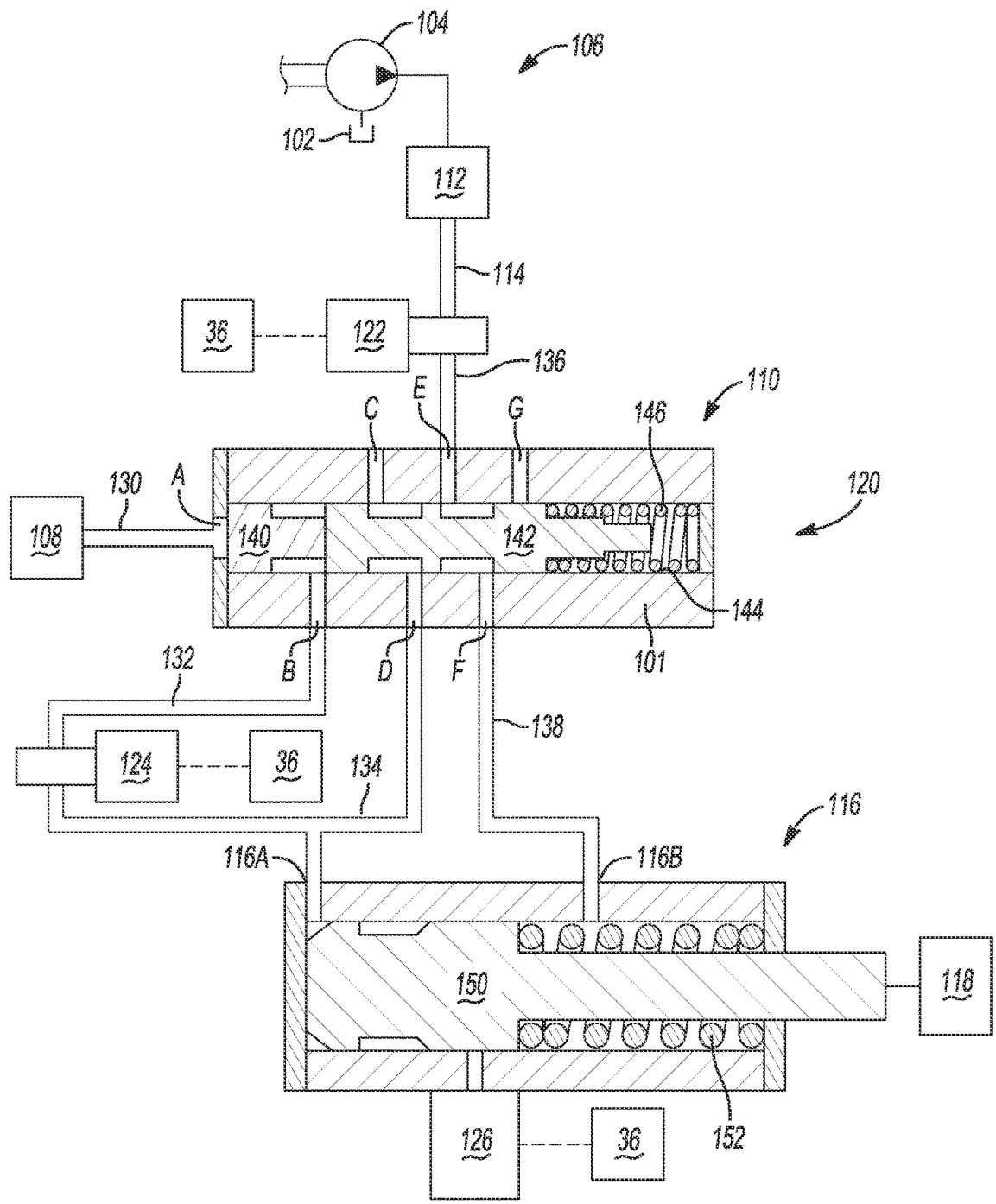
FIG. 2 is a diagram of a portion of a hydraulic control system according to the principles of the present invention.

Turning to FIG. 2, a portion of the hydraulic control system 100 is illustrated. The hydraulic control system 100 generally includes a plurality of interconnected or hydraulically communicating subsystems including a pressure regulator subsystem 106, a clutch control subsystem 108, and an electronic transmission range selection (ETRS) control subsystem 110. The hydraulic control system 100 may also include various other subsystems or modules, such as a lubrication subsystem, a torque converter clutch subsystem, and/or a cooling subsystem, without departing from the scope of the present invention.

The pressure regulator subsystem 106 is operable to provide and regulate pressurized hydraulic fluid, such as transmission oil, throughout the hydraulic control system 100. The pressure regulator subsystem 106 draws hydraulic fluid from the sump 102. The sump 102 is a tank or reservoir preferably disposed at the bottom of the transmission housing 18 to which the hydraulic fluid returns and collects from various components and regions of the transmission. The hydraulic fluid is forced from the sump 102 and communicated throughout the hydraulic control system 100 via the pump 104. The pump 104 may be, for example, a gear pump, a vane pump, a gerotor pump, or any other positive displacement pump. The pressure regulator subsystem 106 may also include an alternate source of hydraulic fluid that includes an auxiliary pump (not shown) preferably driven by an electric engine, battery, or other prime mover (not shown), or an accumulator. The hydraulic fluid from the pump 104 is controlled by a pressure regulator valve 112. The pressure regulator valve 112 regulates the pressure of the hydraulic fluid from the pump 104 and feeds pressurized hydraulic fluid at line pressure to a main supply line 114. The main supply line 114 may include other branches and feed other subsystems, including the clutch control subsystem 108, without departing from the scope of the present invention. The pressure regulator subsystem 106 may also include various other valves and solenoids without departing from the scope of the present invention.

The clutch control subsystem 106 provides hydraulic fluid to clutch actuators (not shown). The clutch actuators are hydraulically actuated pistons that each engage one of the plurality of torque transmitting devices 34 to achieve various forward, or drive speed ratios and reverse speed ratios. Pressurized hydraulic fluid is communicated to these clutch actuators preferably through matching clutch control solenoids (not shown).

The ETRS control subsystem 110 converts electronic input for a requested range selection (Drive, Reverse, Park) into hydraulic and mechanical commands. The hydraulic commands use line pressure hydraulic fluid from the pressure regulator subsystem 106 via main supply line 114 to supply hydraulic fluid to a park servo mechanism 116. The mechanical commands include engaging and disengaging a park mechanism 118. The park mechanism 118 may be a conventional park mechanism that limits rotation of the transmission output shaft 22 or any other type of vehicle motion arresting system. The ETRS control subsystem 110 includes a control valve assembly 120, a first control device 122, a second control device 124, and a park inhibit solenoid assembly 126.

The control valve assembly 120 includes ports 120A-G, numbered consecutively from left to right in FIG. 2. Port 120A is connected to (in communication with) the clutch actuator subsystem 108 via a fluid line 130. Port 120B is connected to the second control device 124 via a fluid line 132. Ports 120C and 120G are exhaust ports that communicate with the sump 102 or an exhaust backfill circuit (not shown). Port 120D is connected to the park servo 116 via an out-of-park feed line 134. Port 120E is connected to the first control device 122 via a valve feed line 136. Port 120F is connected to the park servo 116 by a park feed line 138.

The control valve assembly 120 further includes a latch spool valve 140 and a main spool valve 142 each slidably disposed within a bore 144 formed in the valve body 101. The latch spool valve 140 is moveable between a latch position and an unlatch position. The main spool valve 142 is moveable between a park position (where the main spool valve 142 is to the left in FIG. 2) and an out-of-park position (where the main spool valve 142 is moved to the right in FIG. 2). A biasing member 146, such as a coiled spring, biases the main spool valve 142 to the park position. In the park position, shown in FIG. 2, fluid port 120D exhausts through exhaust port 120C and fluid port 120E communicates with fluid port 120F. In the out-of-park position, fluid port 120E communicates with fluid port 120D and fluid port 120F exhausts through exhaust port 120G.

The park servo assembly 116 includes ports 116A and 116B each located on either side of a piston 150. Port 116A communicates with the out-of-park fluid line 134. Port 116B communicates with the park fluid line 138. The piston 150 is mechanically coupled to the park system 118. The piston 150 is moveable between a park position, shown in FIG. 2, and an out-of-park position (where the piston 150 is moved to the right in FIG. 2). A biasing member 152, such as a spring, biases the piston 150 to the park position. In the park position, the piston 150 engages the park assembly 118 placing the motor vehicle 5 in a park mode of operation where the transmission output shaft 22 is mechanically locked from rotation. Hydraulic fluid supplied to fluid port 116A moves the piston 150 against the force of the biasing member 152 to move the piston 150 to the out-of-park position. Hydraulic fluid may be optionally supplied to the fluid port 116B to help move the piston 150 to the park position.

The first control device 122 connects the main supply line 114 with the valve feed line 136. The first control device 122 is preferably an on/off solenoid but may be a variable pressure, normally high solenoid that selectively allows hydraulic fluid flow from the main supply line 114 to the valve feed line 136. The first control device 122 is in electrical communication with the transmission control module 36.

The second control device 124 connects the out-of-park feed line 134 with the fluid line 132. The second control device 124 is preferably an on/off solenoid but may be a variable pressure, normally high solenoid that selectively allows hydraulic fluid flow from the out-of-park feed line 134 to the fluid line 132. The second control device 124 is in electrical communication with the transmission control module 36.

The park inhibit solenoid 126 is connected to the park servo assembly 116. When activated, the park inhibit solenoid 126 mechanically engages the piston 150 to keep the piston 150 in the out-of-park position. The park inhibit solenoid 126 is in electrical communication with the transmission control module 36.

The transmission control module 36 commands the ETRS subsystem 110 to enter the out-of-park mode of operation from the park mode of operation upon receipt of an electrical signal from a range selector (not shown) in the motor vehicle 5. To transition to the out-of-park mode of operation, the transmission control module 36 commands particular clutches 34 to engage, thus pressurizing the clutch control subsystem 108. Hydraulic fluid communicates from the clutch control subsystem 108 through fluid line 130 and port 120A to contact an end of the latch spool valve 140. The latch spool valve 140 moves to the latch position and moves the main spool valve 142 against the force of the biasing member 146 to the out-of-park position. The transmission control module 36 then commands the first control device 122 to open. Hydraulic fluid communicates through the first control device 122, through fluid line 136 to the out of park feed line 134 via ports 120E and 120D, and into the park servo assembly 150 via port 116A. The hydraulic fluid contacts the piston 150 and moves the piston 150 against the force of the biasing member 152 to the out-of-park position. The park inhibit solenoid 126 is preferably then engaged to keep the piston 116 in the out-of-park position. To latch the control valve assembly 120, the second control device 124 is commanded open. Hydraulic fluid communicates through the second control device 124 and into the control valve assembly 120 via fluid line 132 and port 120B. The hydraulic fluid acts on the latch spool valve 140, moving it to the unlatch position while acting on the main spool valve 142 to keep it in the out-of-park position.

The ETRS subsystem 110 maintains certain conditions during possible failure events. For example, in the event of 12 volt power loss, there is no effect on the system when in park and when in out-of-park the system attempts to engage park. In the event of a failure in the transmission control module 36, when in park the system maintains park and park can only be engaged by turning off the engine 12 or using an emergency park brake (not shown). When in out-of-park, there is no effect. In the event of a failure in the pump 104 where it is set to low pressure, there is no effect on the system when in park and out-of-park. In the event of a failure in the pump 104 where it is set to high pressure, there is no effect in park since the clutches 34 are not engaged and the first control device 122 offers redundancy while there is no effect in the out-of-park mode. In the event the first control device 122 fails when the system is under low hydraulic fluid pressure, there is no effect in park and out-of-park modes. In the event the first control device 122 fails when the system is under high hydraulic fluid pressure, the system will remain in park but to engage park the transmission control module 36 commands low line pressure from the pressure regulator valve 112. In this event there is no effect on the out-of-park mode. In the event the control valve assembly 120 fails and moves to the park condition unexpectedly while in the out-of-park mode, the park inhibit solenoid 126 keeps the piston 150, and the motor vehicle 5, in the out-of-park mode in conjunction with solenoid 122 commanding zero output pressure. In the event the control valve assembly 120 fails to the out-of-park position, the transmission control module 36 both continues to command zero output pressure from solenoid 122 and subsequently commands the line pressure to low in the main supply line 114 from the pressure regulator valve 112 in order to maintain park, as needed. In the event the park inhibit solenoid 126 fails on, fluid may by communicated through the park feed line 138 to overcome the park inhibit solenoid 126 to switch to park mode.

Figure 3:
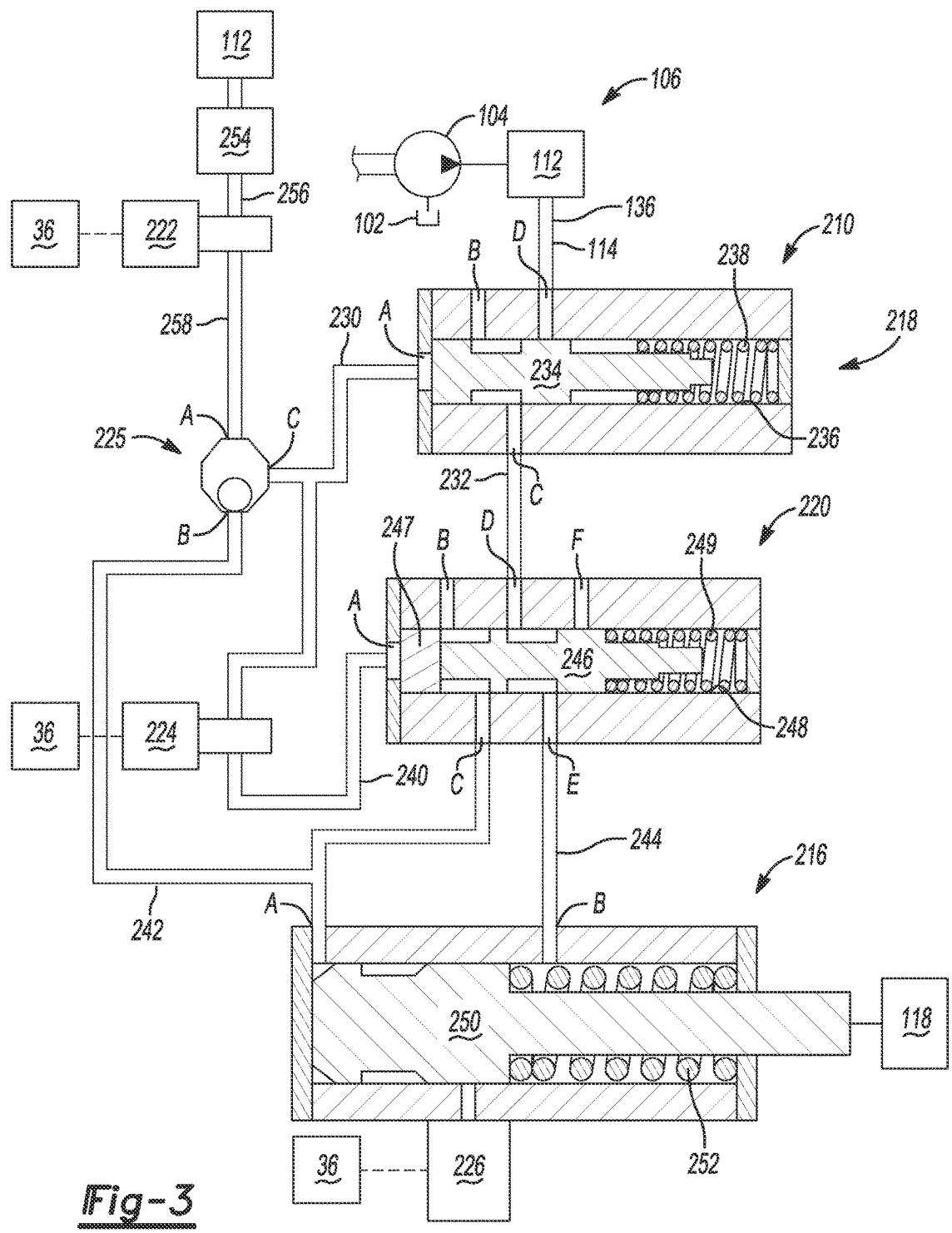
FIG. 3 is a diagram of another example of a portion of a hydraulic control system according to the principles of the present invention.

Turning to FIG. 3, an alternate example of the ETRS subsystem according to the principles of the present invention is generally indicated by reference number 210. The ETRS subsystem 210 includes a park servo mechanism 216, an enablement valve assembly 218, a control valve assembly 220, a first control device 222, a second control device 224, a three way check ball valve 225, and a park inhibit solenoid assembly 226.

The enablement valve assembly 218 includes ports 218A-D, numbered consecutively from left to right in FIG. 3. Port 218A is connected to (in communication with) the three-way ball check valve 225 via a fluid line 230. Port 218B is an exhaust port that communicates with the sump 102 or an exhaust backfill circuit (not shown). Port 218C is connected to an intermediate feed line 232. Port 218D is connected to the main feed line 114.

The enablement valve assembly 218 further includes a spool valve 234 slidably disposed within a bore 236 formed in the valve body 101. The spool valve 234 is moveable between an enable position (where the main spool valve 142 is moved to the right in FIG. 3) and a disable position (shown in FIG. 3). A biasing member 238, such as a coiled spring, biases the spool valve 234 to the disable position. In the disable position, shown in FIG. 3, fluid port 218C exhausts through exhaust port 218B and fluid port 218D is closed. In the enable position, fluid port 218D communicates with fluid port 218C and fluid port 218B is closed.

The control valve assembly 220 includes ports 220A-F, numbered consecutively from left to right in FIG. 3. Port 220A is connected to (in communication with) the second control device 224 via a fluid line 240. Ports 220B and 220F are exhaust ports that communicate with the sump 102 or an exhaust backfill circuit (not shown). Port 220C is connected to the park servo 216 via an out-of-park feed line 242. Port 220D is connected to the intermediate feed line 232. Port 220E is connected to the park servo 216 by a park feed line 244.

The control valve assembly 220 further includes a spool valve 246 and latch valve 247 slidably disposed within a bore 248 formed in the valve body 101. The spool valve 246 is moveable between a park position (shown in FIG. 3) and an out-of-park position (where the spool valve 246 is moved to the right in FIG. 3). A biasing member 249, such as a coiled spring, biases the spool valve 246 to the park position. In the park position, shown in FIG. 3, fluid port 220C exhausts through exhaust port 220B and fluid port 220D communicates with fluid port 220E. In the out-of-park position, fluid port 220D communicates with fluid port 220C and fluid port 220E exhausts through exhaust port 220F.

The park servo assembly 216 includes ports 216A and 216B each located on either side of a piston 250. Port 216A communicates with the out-of-park fluid line 242. Port 216B communicates with the park fluid line 244. The piston 250 is mechanically coupled to the park system 118. The piston 250 is moveable between a park position, shown in FIG. 3, and an out-of-park position (where the piston 250 is moved to the right in FIG. 3). A biasing member 252, such as a spring, biases the piston 250 to the park position. In the park position, the piston 250 engages the park assembly 118 placing the motor vehicle 5 in a park mode of operation where the transmission output shaft 22 is mechanically locked from rotation. Hydraulic fluid supplied to fluid port 216A moves the piston 250 against the force of the biasing member 152 to move the piston 250 to the out-of-park position. Hydraulic fluid may be optionally supplied to the fluid port 216B to help move the piston 250 to the park position.

The first control device 222 is connected to a feed limit valve 254 or main line regulator 112 via fluid line 256. The feed limit valve 254 limits a pressure of the hydraulic fluid from the pressure regulator valve 112. The first control device 222 is also connected to the three-way ball check valve 225 via a fluid line 258. The first control device 222 is preferably an on/off solenoid but may be a variable pressure, normally low solenoid that selectively allows hydraulic fluid flow from the feed limit valve 254 to the three way ball check valve 225. The first control device 222 is in electrical communication with the transmission control module 36.

The second control device 224 connects the fluid line 230 with the fluid line 240. The second control device 224 is preferably an on/off solenoid but may be a variable pressure, normally high solenoid that selectively allows hydraulic fluid flow from fluid line 230 to the fluid line 240. The second control device 224 is in electrical communication with the transmission control module 36.

The three way ball check valve 225 includes three ports: an inlet port 225A, an inlet port 225B, and an outlet port 225C. The three way ball check valve 225 allows fluid communication between the outlet 225C and whichever of the inlets 225A, 225B is providing a higher pressure of hydraulic fluid. The inlet 225A is connected to the fluid line 258. The inlet 225B is connected to the out-of-park feed line 242. The outlet 225C is connected to the fluid line 230.

The park inhibit solenoid 226 is connected to the park servo assembly 216. When activated, the park inhibit solenoid 226 mechanically engages the piston 250 to keep the piston 250 in the out-of-park position. The park inhibit solenoid 226 is in electrical communication with the transmission control module 36.

The transmission control module 36 commands the ETRS subsystem 210 to enter the out-of-park mode of operation from the park mode of operation upon receipt of an electrical signal from a range selector (not shown) in the motor vehicle 5. To transition to the out-of-park mode of operation, the transmission control module 36 commands the first control device 222 to open. Hydraulic fluid communicates from the feed limit valve 254 through line 256 through the first control solenoid 222 to the fluid line 258. The pressurized hydraulic fluid opens port 225A in the check valve 225 and hydraulic fluid communicates to fluid line 230 and through port 218A to contact an end of the spool valve 234. The spool valve 234 moves to the enable position against the force of the biasing member 238. The transmission control module 36 then commands the second control device 224 to open. Hydraulic fluid communicates from fluid line 230 through the second control device 224 to fluid line 240 and through port 220A to contact an end of the spool valve 246. The spool valve 246 moves to the out-of-park position against the force of the biasing member 249. Pressurized hydraulic fluid from the main supply line 114 communicates through the enablement valve assembly 218 to the intermediate feed line 232, and from the intermediate feed line 232 through the control valve assembly 220 to the out-of-park feed line 242, and into the park servo assembly 250 via port 216A. The hydraulic fluid contacts the piston 250 and moves the piston 250 against the force of the biasing member 252 to the out-of-park position. The park inhibit solenoid 226 is preferably then engaged to keep the piston 250 in the out-of-park position. Pressurized hydraulic fluid in the out-of-park feed line 242 feeds back into the check valve 225 and can keep the enable valve assembly 218 and the control valve assembly 220 in out-of-park positions in the event the transmission control module 36 fails and the first control device 222 closes.

The ETRS subsystem 210 maintains certain conditions during possible failure events. For example, in the event of 12 volt power loss, there is no effect on the system when in park and when in out-of-park the system attempts to engage park. In the event of a failure in the transmission control module 36, when in park the system maintains park and park can only be engaged by turning off the engine 12 or using an emergency park brake (not shown). In the case the pump 104 is driven by an electric motor, the electric motor may be shut off. When in out-of-park, there is no effect. In the event of the enablement valve assembly failing in the disabled position, there is no effect on the system when in park and out-of-park. In the event of the enablement valve assembly failing in the enabled position, the system can return to park by closing the second control device 224. In the event the control valve assembly 220 fails and moves to the park condition unexpectedly while in the out-of-park mode, the park inhibit solenoid 126 keeps the piston 250, and the motor vehicle 5, in the out-of-park mode. In the event the control valve assembly 220 fails to the out-of-park position, the transmission control module 36 commands the line pressure to low in the main supply line 114 from the pressure regulator valve 112 in order to maintain park. In the event the park inhibit solenoid 226 fails on, fluid may be communicated through the park feed line 244 to overcome the park inhibit solenoid 226 to switch to park mode.

The description of the invention is merely exemplary in nature and variations that do not depart from the general essence of the invention are intended to be within the scope of the invention. Such variations are not to be regarded as a departure from the spirit and scope of the invention.

The following is claimed:

1. A hydraulic control system in a transmission of a motor vehicle, the hydraulic control system comprising:
   a first control device;
   a control valve assembly having a first port directly hydraulically connected downstream to the first control device, a second port, a third port, a fourth port, and a first valve moveable between a first position and a second position, wherein the first valve allows fluid communication between the first control device and the fourth port when in the first position and allows fluid communication between the first control device and the third port when in the second position;
   a park servo assembly directly hydraulically connected downstream to the third and fourth ports of the control valve assembly, the park servo assembly configured to control a park mechanism; and
   a second control device connected directly between the second port of the control valve assembly and the park servo assembly and the third port of the control valve assembly.

2. The hydraulic control system of claim 1 wherein the park servo assembly includes an out-of-park port directly connected to the third port of the control valve assembly and to the second control device and a park port directly connected to the fourth port of the control valve assembly.

3. The hydraulic control system of claim 2 wherein the park servo assembly includes a park piston mechanically connected to the park mechanism, wherein the park piston is moveable between an out-of-park position and a park position, and wherein the out-of-park port communicates with an opposite side of the park piston than the park port.

4. The hydraulic control system of claim 3 further comprising a park inhibit solenoid assembly that selectively engages the park piston to keep the park piston in the out-of-park position.

5. The hydraulic control system of claim 1 wherein the control valve assembly includes a second valve coaxial with the first valve.

6. The hydraulic control system of claim 5 wherein the control valve assembly includes a fifth port connected to a clutch actuator subsystem and the fifth port communicates hydraulic fluid to an end of the second valve.

7. The hydraulic control system of claim 6 wherein the second port communicates hydraulic fluid to an end of the first valve.

8. The hydraulic control system of claim 1 wherein the first control device receives pressurized hydraulic fluid from a pressure regulator subsystem.

9. The hydraulic control system of claim 1 wherein the first control device is a normally high solenoid electronically controlled by a transmission control module.

10. The hydraulic control system of claim 9 wherein the second control device is a normally high solenoid electronically controlled by the transmission control module.

11. A hydraulic control system in a transmission of a motor vehicle, the hydraulic control system comprising:
a pressure regulator subsystem for providing a pressurized hydraulic fluid;
a first solenoid downstream of the pressure regulator subsystem for receiving the pressurized hydraulic fluid;
a control valve assembly having a first port directly hydraulically connected downstream to the first solenoid, a second port, a third port, a fourth port, a fifth port, a first valve, and a second valve, wherein the first valve is moveable between a first position and a second position and the first valve allows fluid communication between the first port and the fourth port and prevents fluid communication between the first port and the third port when in the first position and the first valve allows fluid communication between the first port and the third port and prevents fluid communication between the first port and the fourth port when in the second position, and wherein the fifth port communicates with an end of the second valve;
a clutch actuator subsystem that provides pressurized hydraulic fluid to the fifth port of the control valve assembly;
a park servo assembly directly hydraulically connected downstream to the third and fourth ports of the control valve assembly, the park servo assembly configured to control a park mechanism; and
a second solenoid connected directly between the second port of the control valve assembly and the park servo assembly and the third port of the control valve assembly.

12. The hydraulic control system of claim 11 wherein the park servo assembly includes an out-of-park port directly connected to the third port of the control valve assembly and to the second control device and a park port directly connected to the fourth port of the control valve assembly.

13. The hydraulic control system of claim 12 wherein the park servo assembly includes a park piston mechanically connected to the park mechanism, wherein the park piston is moveable between an out-of-park position and a park position, and wherein the out-of-park port communicates with an opposite side of the park piston than the park port.

14. The hydraulic control system of claim 13 further comprising a park inhibit solenoid assembly that selectively engages the park piston to keep the park piston in the out-of-park position.

15. The hydraulic control system of claim 11 wherein the second port communicates hydraulic fluid to an end of the first valve.

* * * * *